Aug. 22, 1944.    A. KRONENBERGER    2,356,597
RUDDER MACHINE FOR AUTOMATIC PILOTS
Filed Nov. 13, 1940

INVENTOR
ADAM KRONENBERGER
BY
Herbert H. Thompson
his ATTORNEY.

Patented Aug. 22, 1944

2,356,597

UNITED STATES PATENT OFFICE 2,356,597

RUDDER MACHINE FOR AUTOMATIC PILOTS

Adam Kronenberger, Berlin, Germany; vested in the Alien Property Custodian

Application November 13, 1940, Serial No. 365,430
In Germany August 25, 1939

9 Claims. (Cl. 244—77)

This invention relates to an automatic steering device, the servo-motor of which is connected to the controlled member by means of a disengaging clutch. Especially with aircraft, it is advisable for safety reasons to incorporate within the automatic steering devices means for disengaging the rudder motor from the steering linkages. Such a coupling has the advantage that the servo-motor is not dragged along when steering is done by hand and that, therefore, its friction and resistance does not have to be overcome. Until recently, steering by hand generally was accomplished by short-circuiting the double-acting pressure fluid driven steering mechanism by means of a passage leading from one side to the other side. The disengaging of a cut-off clutch, which was provided for emergencies in aircraft steering devices, was generally not used because the re-engaging of the clutch was difficult. Great care had to be exercised to couple the rudder motor so as to keep the rudder in the correct relative position. If the two parts of the coupling were connected in any accidental position, it might be possible that the rudder motor, with its transmission system, would impose a wrong position upon the rudder, or the rudder motor might reach its stop, which in most present systems with limited stroke would happen long before the rudder is fully deflected.

The present invention solves the problem of causing correct relative positioning of the two parts of the clutch at the moment of engagement and furthermore, of causing engagement automatically. According to the present invention, the correct position between the coupling parts is obtained by means of a follow-up system which creates an impulse if the parts of the coupling have a relative deviation from their neutral position, which impulse controls the servo-motor in such a way that it moves its own coupling part in a direction to follow the other part of the coupling, whereby engagement automatically occurs as soon as both parts reach their neutral position.

If an electromagnetic clutch is used, a switch is preferably provided which furnishes the follow-up impulse for an electromagnetic device controlling the servo-motor. This switch is connected in the manner of a voltage divider. The wrong engagement of the two clutch parts is prevented in the simplest way by a spacer which is connected to one part of the coupling and which allows engaging of the two halves only if they are in their relative neutral position.

The follow-up motion of the servo-motor may be arranged in such a way that the follow-up impulses act upon the same device which now serves the purpose of transmitting the steering impulses to the rudder motor, provided the follow-up impulses are more powerful than the impulses of the steering device.

When starting the steering device, the engaging of the clutch may be accomplished automatically in a simple manner by coupling the switch for the clutch magnet with the switch device controlling the rudder motor. This may be done by a single switch.

The invention is further explained by means of the modification shown in the drawing.

Figure 3:
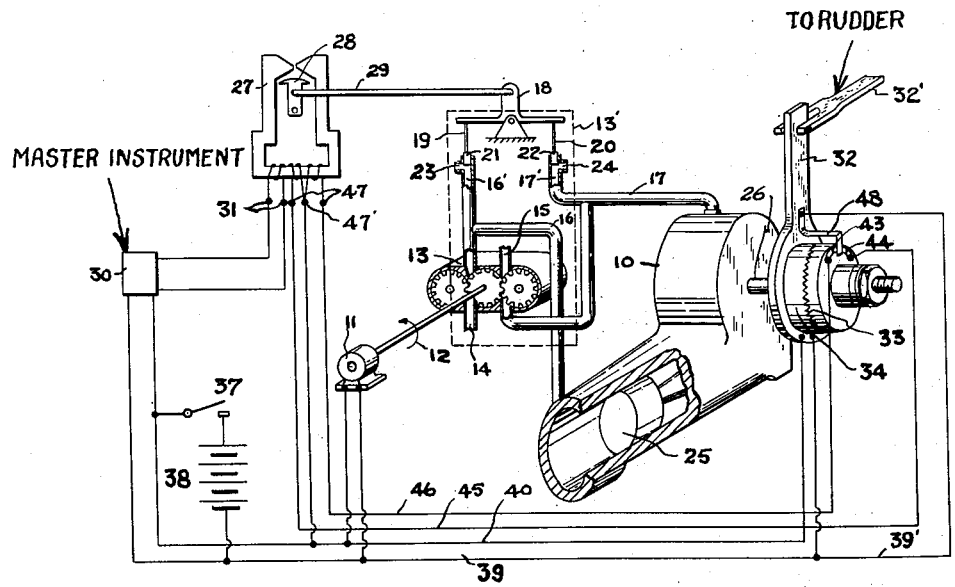
Fig. 3 shows the assembly of the essential parts of an automatic steering device containing the coupling of this invention. This drawing is partly a perspective schematic.

In Fig. 3 the rudder motor 10 is designed as a crank-piston motor and is shown open in front. Oil serves as the pressure fluid and is provided by a three-wheel gear pump 13 driven by an electric motor 11 in the direction of the arrow 12. The oil is sucked in through the pipes 14 and 15 and is pressed into the passages 16 and 17 leading to the servo-motor. The control of the pressure oil is accomplished by a see-saw 18 to which two control pistons 21 and 22 are connected by means of spring wires 19 and 20. If the see-saw 18 is inclined, one of the openings 23, 24 is throttled, while the oil can freely escape through the other opening. In the throttled passage 16' and 17', respectively, a pressure appears which acts upon the rudder motor through passages 16 or 17, respectively, and thereby causes a corresponding motion of the power piston 25. The motion of the piston is transmitted as rotation to the shaft 26 by means of a crank (not shown).

As described in the copending application of G. Wunsch, B. Weinkauff, W. Sadowski and H. Kobischke, Serial No. 366,364, for Rudder machine for automatic pilots, filed November 20, 1940, the oil pump 13 and the drive motor 11 may be built into an integral assembly with the see-saw 18 and the rudder motor 10.

The see-saw 18 is controlled by a rotary magnet 27, the armature 28 of which is connected to the see-saw by means of a link 29. The actual automatic steering impulses are transmitted to the rotary magnet from an electrical pick-off or transmitter, of known design, on the master instrument 30, such as a directional gyroscope, through the winding 31. As soon as the aircraft deviates from the desired attitude, the transmitter 30 sends current of correct direction through the coil 31, whereby turning of the armature 28 is caused, which in turn inclines the see-saw 18 and starts the rudder motor. The motion of the shaft 26 then is transferred to the rudder linkage 32' by means of a lever 32.

The lever 32 is free to turn around the shaft 26 as long as it is not in engagement with the part 33 of the coupling. The part 33 may be shifted lengthwise on the splines 26' of the shaft 26 and may be engaged with another clutch part 34. The part 34 is rigidly connected to the lever 32 and with the same is pressed onto a bushing 35 which in turn is pivoted on the shaft 26.

In Fig. 3 the two parts 33 and 34 of the clutch are engaged.

Figure 1:
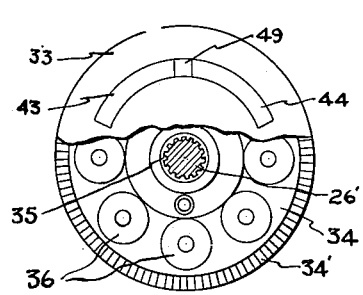
Fig. 1 shows a top view of the electromagnetic clutch, partly in section, along the line 1—1 of Fig. 2.
Figure 2:
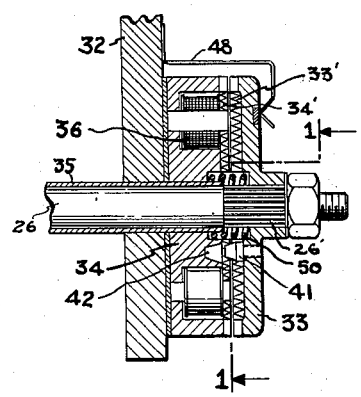
Fig. 2 shows a longitudinal section through the two parts of the coupling.

Fig. 2 shows the same parts disengaged.

Within the part 34 of the coupling, a number of electromagnets 36 are mounted, one of which is shown in section in Fig. 2. The two parts 33 and 34 of the coupling are made of soft iron and have teeth on their opposing engaging surfaces.

If a switch 37 in Fig. 3 is closed, a battery 38 is connected by means of leads 39 and 40 to the electromagnets 36. These magnets now attract part 33 of the coupling toward the part 34. The two parts of the clutch can only engage each other when a spacer 41 pressed into part 33 is directly opposite a hole 42 in the clutch body 34. In this position, the two clutch parts are in their relative neutral position.

In order to cause the two parts of the clutch to attain this position, the armature 33 of the clutch has two contact segments 43 and 44 which, by means of leads 45 and 46 are connected to a winding 47 on the rotary magnet 27. The winding 47 is center-tapped at 47' and is connected to one terminal of the battery 38 if switch 37 is closed. The other terminal of the battery is connected by means of leads 39 and 39' to a spring contact brush 48.

The operation is as follows:

If switch 37 is closed, motor 11 is excited, oil pump 13 is started and the transmitter 30 is ready for action. Furthermore, the electromagnets 36 are excited and the center tap 47' of coil 47 is connected to the line. As long as there is relative positional disagreement between the two halves of the coupling, the spring brush 48 contacts one of the two segments 43 or 44. This causes a current to flow in one half of the winding 47 of the rotary magnet 27, which produces a motion of the armature 28 in such a direction that the shaft 26 of the rudder motor and, thereby, the part 33 of the coupling, follows the part 34 of the coupling.

The position of part 34 is given by the lever 32 or by the position of the steering linkage 32'. The impulse causing follow-up motion of the rudder motor is of such a nature that in all cases it overpowers any impulse arriving at coil 31 from the transmitter 30. This assures the automatic follow-up action of the rudder motor no matter what the condition or action of the transmitter may be.

When relative positional agreement of the two halves of the coupling has been obtained, the spacer pin 41 is opposite hole 42, and the teeth 33' and 34' engage each other while part 33 of the clutch moves axially along the splines of the shaft 26'. As soon as positional agreement is obtained, coil 47 is disconnected because the spring brush 48 is now resting upon an insulated piece 49 located between the two segments 43 and 44. Even if the brush 48 should be somewhat wider than the insulated piece 49, the coil 47 is disconnected because the brush is not resilient enough to follow the part 33 of the coupling, whereby the connection between the brush 48 and the segments 43 and 44 is always interrupted.

Disengaging of the coupling after opening of switch 37, which disconnects the electromagnets 36, is assured by a helical spring 50 located between the two halves of the coupling, the pressure of which is somewhat smaller than that of the magnets when excited.

Although the above described arrangement has been developed especially for automatic steering devices for aircraft, it is understood that the same may be applied generally to stationary automatic regulators or servo-motor controls.

Having described my invention, what I claim and desire to secure by Letters Patent is:

1. In a disconnectable automatic steering device for aircraft having a servo-motor, an automatic controller for said motor and a rudder, a normally disengaged two-part clutch between said servo-motor and rudder, and an additional controller at the clutch responsive to the relative position of the rudder and motor, and effective to rotate said motor to bring the two parts of the clutch into a predetermined relationship upon throwing said automatic steering device into action.

2. In a disconnectable automatic steering device for aircraft having a servo-motor, a rudder and disconnectable, two-part clutch therebetween, a follow-up controller between the two parts of said clutch, means operated thereby for turning the servo-motor until the two parts are in a predetermined relationship, and means for preventing engagement of the clutch until such relationship is attained.

3. An automatic steering device according to claim 2, in which the transmission of the servo-motor motion is accomplished by means of an electromagnetic clutch, characterized by the arrangement of a single-pole double-throw switch controlled by the relative motion of the two halves of the clutch which by means of a voltage divider arrangement furnishes the follow-up impulses for an electromagnetic device controlling the servo-motor.

4. In a disconnectable automatic steering device for aircraft, a servo-motor, an automatic controller for said motor and a rudder, a normally disengaged two-part clutch between said servo-motor and rudder, an additional controller at the clutch responsive to the relative position of the rudder and motor, and effective to rotate said motor to bring the two parts of the clutch into a predetermined relationship upon throwing said automatic steering device into action, and means for preventing engagement of the clutch until such relationship is attained.

5. An automatic steering device according to claim 4, characterized by the arrangement that the additional controller impulses are more powerful than the automatic controller impulses.

6. In an automatic steering device for dirigible craft, a master electric controller, a hydraulic servo-motor, an electro-hydraulic relay between said servo-motor and controller and having a primary excited from said controller and a relatively stronger secondary winding, a two-part electromagnetic clutch normally driven from said servo-motor and adapted to be energized upon energization of said device, a follow-up controller on said clutch for exciting said secondary, and means for preventing engagement of said clutch until a predetermined relationship is reached.

7. An automatic steering device as claimed in claim 1, having an electrical circuit with a common electrical relay in circuit with both said automatic controller and said additional controller, said relay controlling the operation of said motor.

8. In an automatic steering device for aircraft having a master controller which exerts an electrical control effect in accordance with the control to be exerted, a servo-motor, a relay responsive to the control effect exerted and effective to operate said servo-motor to cause the control effect desired, said relay having an auxiliary secondary winding which dominates the action of said control effect, an electromagnetic clutch driven by said servo-motor and adapted to be engaged upon the activation of said servo-motor, and means mounted on said clutch to exert an auxiliary control effect when said servo-motor is activated if the two parts of said clutch are not in a predetermined relationship, additional means effective to prevent the engagement of the two parts of said clutch except when the two parts are in said predetermined relationship, said first named means also including means to exert said auxiliary control effect upon said auxiliary winding.

9. Apparatus as described in claim 8 wherein said clutch is formed by two parts one of which is a shell construction and the other of which is a plate, said shell construction being rotatably mounted about its axis and being rigidly attached to a control arm, a plurality of electromagnets spaced radially about said axis and enclosed within said shell construction with their axes parallel to said axis and adapted to exert a magnetic effect drawing said plate toward engagement with said shell construction, a spring centrally positioned and exerting a force tending to hold said plate from said shell construction, and wherein said means mounted on said clutch includes a contactor in the form of a spring arm mounted at one end rigid with respect to said shell construction and extending over the side of said plate opposite said shell construction and an arcuately extending contactor assembly upon said plate adapted to be engaged by said contactor when said plate is out of engagement with said shell construction.

ADAM KRONENBERGER.